US008407294B2

(12) United States Patent
Dodrill et al.

(10) Patent No.: US 8,407,294 B2
(45) Date of Patent: *Mar. 26, 2013

(54) UNIFIED MESSAGING SYSTEM USING WEB BASED APPLICATION SERVER FOR MANAGEMENT OF MESSAGES USING STANDARDIZED SERVERS

(75) Inventors: Lewis Dean Dodrill, Richmond, VA (US); Geetha Ravishankar, Glen Allen, VA (US); Satish Joshi, Glen Allen, VA (US); Ryan Alan Danner, Glen Allen, VA (US); Susan Harrow Barban, Midlothian, VA (US); Steven J. Martin, Richmond, VA (US); Swaminathan Ravishankar, Glen Allen, VA (US)

(73) Assignee: Cisco Technology, Inc., San Jose, CA (US)

( * ) Notice: Subject to any disclaimer, the term of this patent is extended or adjusted under 35 U.S.C. 154(b) by 2318 days.

This patent is subject to a terminal disclaimer.

(21) Appl. No.: 11/219,844

(22) Filed: Sep. 7, 2005

(65) Prior Publication Data

US 2006/0047767 A1 Mar. 2, 2006

Related U.S. Application Data

(63) Continuation of application No. 09/588,293, filed on Jun. 7, 2000, now Pat. No. 6,990,514.

(60) Provisional application No. 60/152,316, filed on Sep. 3, 1999.

(51) Int. Cl.
*G06F 15/16* (2006.01)
(52) U.S. Cl. ........ 709/206; 709/217; 709/218; 709/219; 709/246
(58) Field of Classification Search .................. 709/206, 709/217, 218, 219, 246
See application file for complete search history.

(56) References Cited

U.S. PATENT DOCUMENTS

| | | | |
|---|---|---|---|
| 4,837,798 A | 6/1989 | Cohen et al. | |
| 6,028,917 A | 2/2000 | Creamer et al. | |
| 6,233,318 B1 | 5/2001 | Picard et al. | |
| 6,260,050 B1 | 7/2001 | Yost et al. | |
| 6,282,270 B1 | 8/2001 | Porter | |
| 6,285,991 B1 | 9/2001 | Powar | |
| 6,353,661 B1 | 3/2002 | Bailey, III | |
| 6,366,950 B1 | 4/2002 | Scheussler et al. | |
| 6,370,141 B1 | 4/2002 | Giordano et al. | |

(Continued)

OTHER PUBLICATIONS

Bos, "XML in 10 Points", W3.org (Aug. 26, 1999).

*Primary Examiner* — Carl Colin
*Assistant Examiner* — Harunur Rashid
(74) *Attorney, Agent, or Firm* — Leon R. Turkevich (57) ABSTRACT

A unified web-based voice messaging system uses an application server, configured for executing a voice application defined by XML documents, that accesses subscriber attributes from a standardized information database server (such as LDAP), and messages from a standardized messaging server (such as IMAP), regardless of message format. The application server, upon receiving a request from a browser serving a user, accesses the standardized database server to obtain attribute information for responding to the voice application operation request. The application server generates an HTML document having media content and control tags for personalized execution of the voice application operation based on the attribute information obtained from the standardized database server. The application server also is configured for storing messages for a called party in the standardized messaging server by storing within the message format information that specifies the corresponding message format. Hence, the application server can respond to a request for a stored message from a subscriber by accessing the stored message from the standardized messaging server, and generating an HTML document having media content and control tags for presenting the subscriber with the stored message in a prescribed format based on the message format and the capabilities of the access device used by the subscriber.

59 Claims, 6 Drawing Sheets

U.S. PATENT DOCUMENTS

| | | |
|---|---|---|
| 6,373,926 B1 | 4/2002 | Foladare et al. |
| 6,411,685 B1 * | 6/2002 | O'Neal .................... 379/88.14 |
| 6,421,708 B2 | 7/2002 | Bettis |
| 6,421,709 B1 | 7/2002 | McCormick et al. |
| 6,424,828 B1 | 7/2002 | Collins et al. |
| 6,430,177 B1 * | 8/2002 | Luzeski et al. ............... 370/356 |
| 6,446,096 B1 | 9/2002 | Holland et al. |
| 6,449,634 B1 | 9/2002 | Capiel |
| 6,476,833 B1 * | 11/2002 | Moshfeghi .................... 715/854 |
| 6,477,576 B2 | 11/2002 | Angwin et al. |
| 6,523,063 B1 | 2/2003 | Miller et al. |
| 6,529,956 B1 | 3/2003 | Smith et al. |
| 6,535,506 B1 | 3/2003 | Narain et al. |
| 6,535,586 B1 | 3/2003 | Cloutier et al. |
| 6,549,612 B2 | 4/2003 | Gifford et al. |
| 6,553,410 B2 | 4/2003 | Kikinis |
| 6,594,699 B1 | 7/2003 | Sahai et al. |
| 6,629,130 B2 | 9/2003 | Mertama et al. |
| 6,651,087 B1 | 11/2003 | Dennis |
| 2002/0131561 A1 * | 9/2002 | Gifford et al. ............... 379/67.1 |

* cited by examiner

UNIFIED MESSAGING SYSTEM USING WEB BASED APPLICATION SERVER FOR MANAGEMENT OF MESSAGES USING STANDARDIZED SERVERS

CROSS REFERENCE TO RELATED APPLICATIONS

This application is a continuation of application Ser. No. 09/588,293, filed Jun. 7, 2000 now U.S. Pat. No. 6,990,514.

This application claims priority from provisional application No. 60/152,316, filed Sep. 3, 1999, the disclosure of which is incorporated in its entirety herein by reference.

BACKGROUND OF THE INVENTION

1. Field of the Invention

The present invention relates to generating and executing voice enabled web applications within a hypertext markup language (HTML) and hypertext transport protocol (HTTP) framework.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/480,485, filed Jan. 11, 2000, entitled Application Server Configured for Dynamically Generating Web Pages for Voice Enabled Web Applications, the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information. Hence, the XML documents define the application to be executed by the application server within the runtime environment, enabling voice enabled web applications to be generated and executed without the necessity of programming language environments.

Existing voice mail systems suffer from the disadvantage that they are built upon proprietary hardware and software systems according to the public switched telephone network architecture. Hence, users have been forced to purchase voice mail systems from providers of public switched telephone network and private branch exchange (PBX) products. Moreover, the reliance on proprietary hardware and software systems increases user costs, limits the interchange of messages to users of those same proprietary systems, and hinders customization. Existing attempts at developing a unified messaging application rely on building on top of the proprietary systems, else are not scalable.

SUMMARY OF THE INVENTION

There is a need for an arrangement that enables users to deploy a scalable, open standards based unified messaging system on an open standards based network such as an Internet Protocol (IP) network.

There is also a need for an arrangement that enables users to customize unified messaging systems, without the necessity of public switched telephone network-based voice mail systems.

These and other needs are attained by the present invention, where an application server, configured for executing a messaging application defined by XML documents, provides unified messaging services based on subscriber attributes obtained from a standardized information database server (such as LDAP), and based on storage and retrieval of messages from a standardized messaging server (such as IMAP), regardless of message format. The application server, upon receiving a voice application operation request from a browser serving a user, accesses the standardized database server to obtain attribute information for responding to the voice application operation request. For example the request may originate from a browser, serving a calling party attempting to reach a called party, for initiation of a message storage operation for the calling party, causing the application server to determine subscriber attributes for the called party and whether subscriber attributes are present for the calling party; alternately, the request may originate from a browser serving a subscriber attempting to access his or her messages. The application server generates an HTML document having media content and control tags for personalized execution of the voice application operation based on the attribute information obtained from the standardized database server. The application server also is configured for storing messages for a called party in the standardized messaging server by storing within the message format information that specifies the corresponding message format. Hence, the application server can respond to a request for a stored message from a subscriber by accessing the stored message from the standardized messaging server, and generating an HTML document having media content and control tags for presenting the subscriber with the stored message in a prescribed format based on the message format and the capabilities of the access device used by the subscriber.

One aspect of the present invention provides a method in an application server for executing a messaging application. The method includes receiving a first HTTP request for execution of a prescribed messaging application operation for a subscriber. The method also includes accessing attribute information for the subscriber from an Internet Protocol (IP) based database server configured for storing subscriber attributes, and accessing an IP-based messaging server for subscriber messaging information based on the accessed attribute information. An HTML page is then generated, for execution of the prescribed messaging application operation and having media content and control tags, based on the first HTTP request and the subscriber messaging information. Accessing of attribute information for the subscriber from an IP-based database server enables distributed processing of subscriber profile information by controlling messaging operations by the application server, and storing profile information in a separate database. In addition, the accessing of subscriber messaging information from the IP-based messaging server enables messaging operations to be distributed across multiple messaging server platforms, independent of the messaging format. Hence, the application server can provide a robust, scalable system for unified messaging using and open standards based platforms such as Internet protocol, enabling deployment using Internet and web based technologies, without the necessity of telephony type voice mail systems.

Another aspect of the present invention provides an application server configured for configured for executing a messaging application. The application server includes a hypertext transport protocol (HTTP) interface for receiving an HTTP request specifying execution of a prescribed messaging application operation for a subscriber, and an application runtime environment. The application runtime environment is configured for dynamically generating, in response to the HTTP request, a first hypertext markup language (HTML) document having media content for execution of the messaging application operation for the subscriber based on accessing attribute information for the subscriber from an Internet Protocol (IP) based database server configured for storing subscriber attributes, and based on accessing an IP-based messaging server for subscriber messaging information based on the accessed attribute information.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
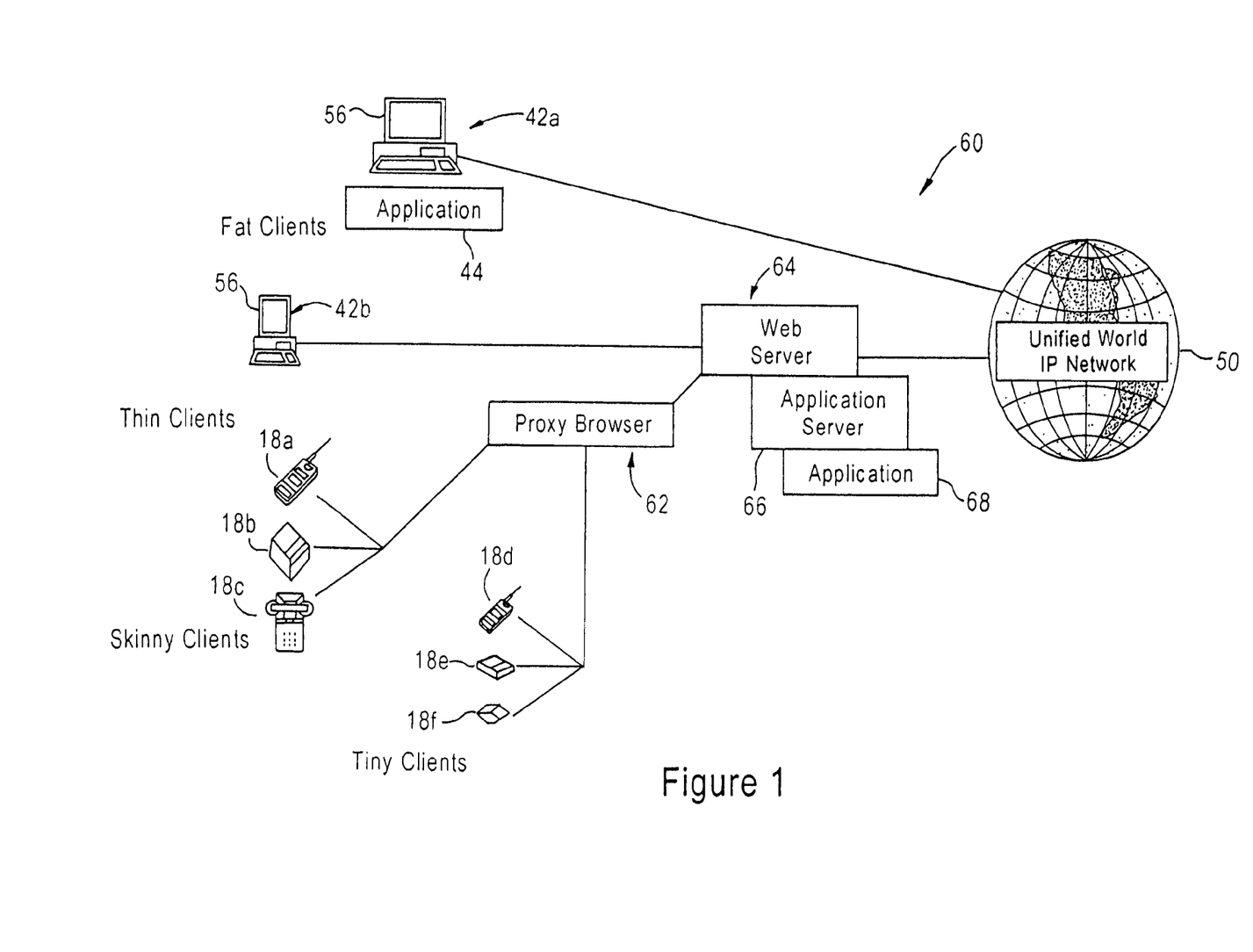
FIG. 1 is a block diagram illustrating an system enabling deployment of a unified messaging system, capable of executing voice enabled web applications, according to an embodiment of the present invention.

FIG. 1 is a block diagram illustrating an architecture that provides unified voice messaging services and data services via an IP network using browser audio control according to an embodiment of the present invention, reproduced from FIG. 3 of the above-incorporated application Ser. No. 09/480,485. The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

As shown in FIG. 1, each of the clients (tiny clients, skinny clients, thin clients and fat clients) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients", defined as devices that are able to interface with a user to provide voice and/or data services (e.g., via a modem) but cannot perform any control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the unified voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the unified messaging network 60.

Figure 2:
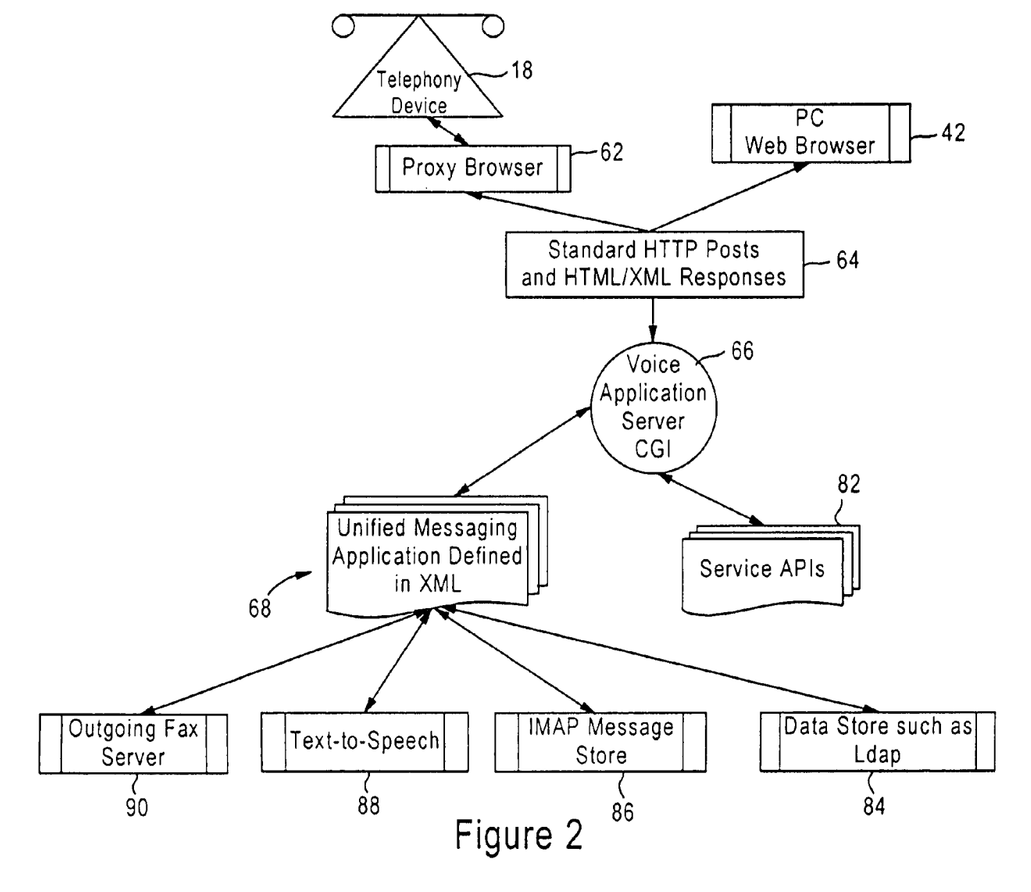
FIG. 2 is a diagram illustrating interactions by the application server of FIG. 1 with resources via an IP network for execution of voice messaging services according to an embodiment of the present invention.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications 68. For example, the web server 64 may access the application server 66 across a common gateway interface (CGI) as illustrated in FIG. 2, by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages 68 (i.e., XML pages that define an application) and in response generate new HTML pages having XML tags during runtime and supply the generated HTML pages having XML tags to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 18 or 42.

FIG. 2 is a diagram illustrating in further detail the unified messaging system implemented by the voice application server 66 according to an embodiment of the present invention. As described above expect to FIG. 1, the application server 66 receives via the web server 64 HTTP requests from either a PC-based web browser 42 capable of supplying full media content (e.g., audio, text, images, and streaming video), or a proxy browser 62 configured for serving as an HTTP interface for a user input device, such as a telephone 18, having limited media capabilities (e.g., audio only). In response to receiving the HTTP requests, the voice application server 66 accesses a selected XML document 68 based on parameters specified within the HTTP request (e.g., commands specified within the URL), and based on application state determined from accessing a brownie, assuming the HTTP request specifies a valid session identifier. As described below, the application runtime environment within the voice application server 66 parses the XML tags within the accessed XML document 68, and dynamically generates an HTML page having XML tags that specify media content (e.g., .wav files) and control information for playing the media files by the corresponding browser.

The voice application server 66 is configured for accessing service application programming interfaces (API's) 82 to external resources based on prescribed procedures that may be called during parsing of an XML tags in a selected XML document 68. As described below, the application server 66 issues function calls to an API 82 for accessing the external resources for prescribed operations, enabling the deployment of a robust, scalable unified messaging system having messaging operations distributed across multiple platforms. In particular, the application server 66 accesses subscriber profile information from an IP-based database server 84 according to LDAP protocol. As described below, the application server 66 is configured for storing and retrieving messages in a standardized format (e.g., e-mail with binary encoded attachments) in an IMAP messaging server 86. In addition, the application server 66 may issue function calls for a text to speech resource 88, or an outgoing fax server 90, in order to deliver different-format messages to users, depending on the capability of the user devices. Hence, the voice application server 66 may access the text to speech resource 88 for converting an e-mail message into a audio-based message to be played for the user of the telephony device 18. Similarly, the voice application server 66 may determine that the proxy browser 66 does not interface with a telephony gateway device having facsimile transmission capabilities, hence the fax message retrieved from the IMAP message store 86 would be sent to the outgoing fax server 90 for retransmission to another telephone number identified as serving a fax machine.

Figure 3:
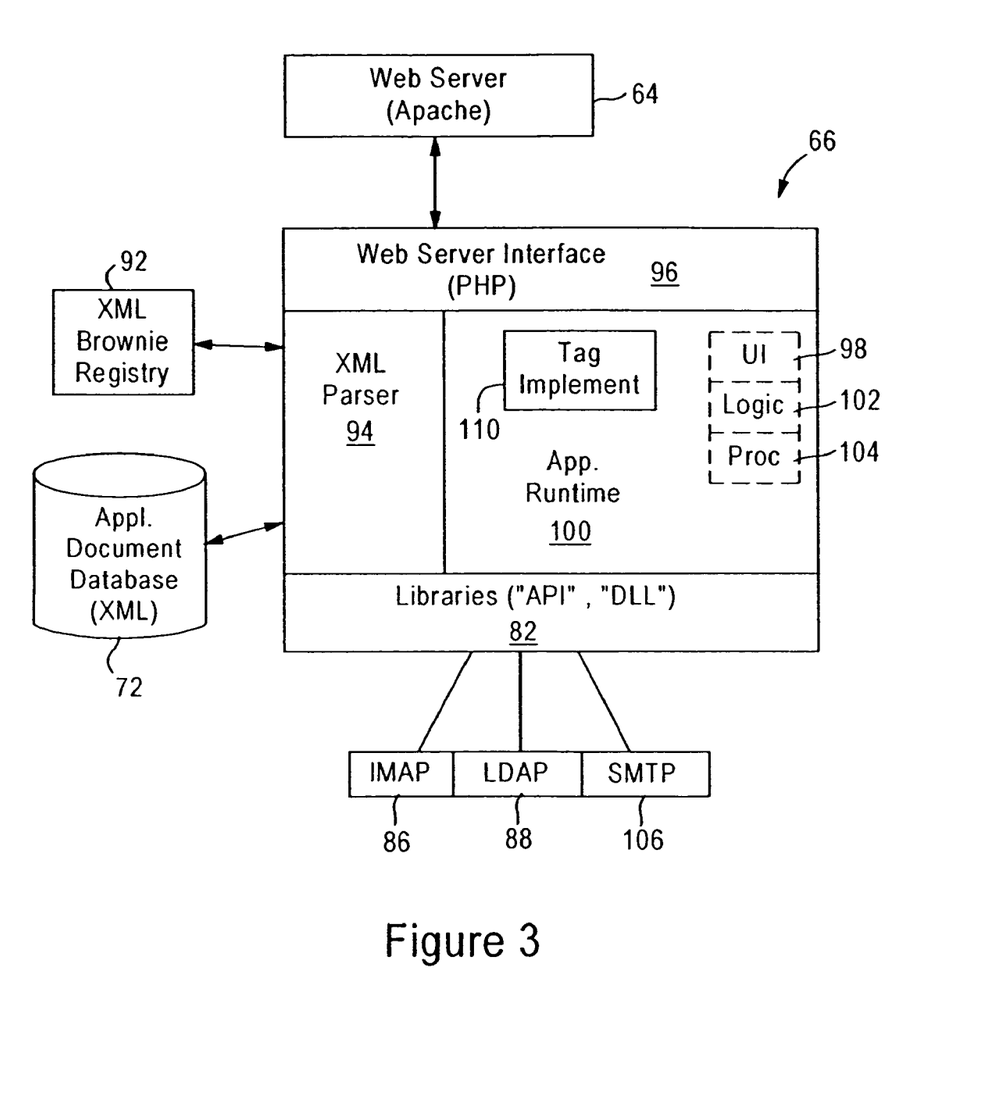
FIG. 3 is a diagram illustrating in detail the application server of FIGS. 1 and 2 according to an embodiment of the present invention.

FIG. 3 is a diagram illustrating in detail the application server 66 according to an embodiment of the present invention. The application server 66 is implemented as a server executing a PHP hypertext processor with XML parsing and processing capabilities, available open source on the Internet at http://www.php.net. As shown in FIG. 3, the server system 66 includes an XML parser 94 configured for parsing the application-defining XML documents 68 stored in the XML document database 72, or the XML documents (i.e., "brownies") stored in the registry 92 and configured for specifying the state and attributes for respective user sessions. The application server 66 also includes a high speed interface 96 that establishes a high-speed connection between the application server 66 and the web server 64. For example, the PHP hypertext processor includes a high-speed interface for Apache Web servers.

The application server 66 also includes a runtime environment 100 for execution of the parsed XML documents. As described above, the runtime environment 100 may selectively execute any one of user interface operation 98, a logic operation 102, or a procedure call 104 as specified by the parsed XML document by executing a corresponding set of executable functions based on the rule set for the corresponding operation. In particular, the application runtime environment 100 includes a tag implementation module 110 that implements the XML tags parsed by the XML parser 94. The tag implementation module 110 performs relatively low-level operations, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag. Hence, the tag implementation module 110 implements the tag operations that are specified within the XML framework of the stored XML documents.

The application server 66 also includes a set of libraries 82 that may be implemented as dynamically linked libraries (DLLs) or application programming interface (API) libraries. The libraries 82 enable the runtime environment 100 to implement the procedures 104 as specified by the appropriate XML document. For example, the application server 66 may issue a function call to one of a plurality of IP protocol compliant remote resources 86, 242, or 106 according to IMAP protocol, LDAP Protocol, or SMTP protocol, respectively, described below. For example, the PHP hypertext processor includes executable routines capable of accessing the IMAP or LDAP services. Note that the mechanisms for accessing the services 86, 242, or 106 should be established within the application server before use of XML documents that reference those services. Once the services 86, 242, or 106 are established, the application runtime environment 100 can perform a function operation by using executable functions specified by a function call rule set.

The arrangement for executing unified messaging application operations will now be described.

Figure 4A:
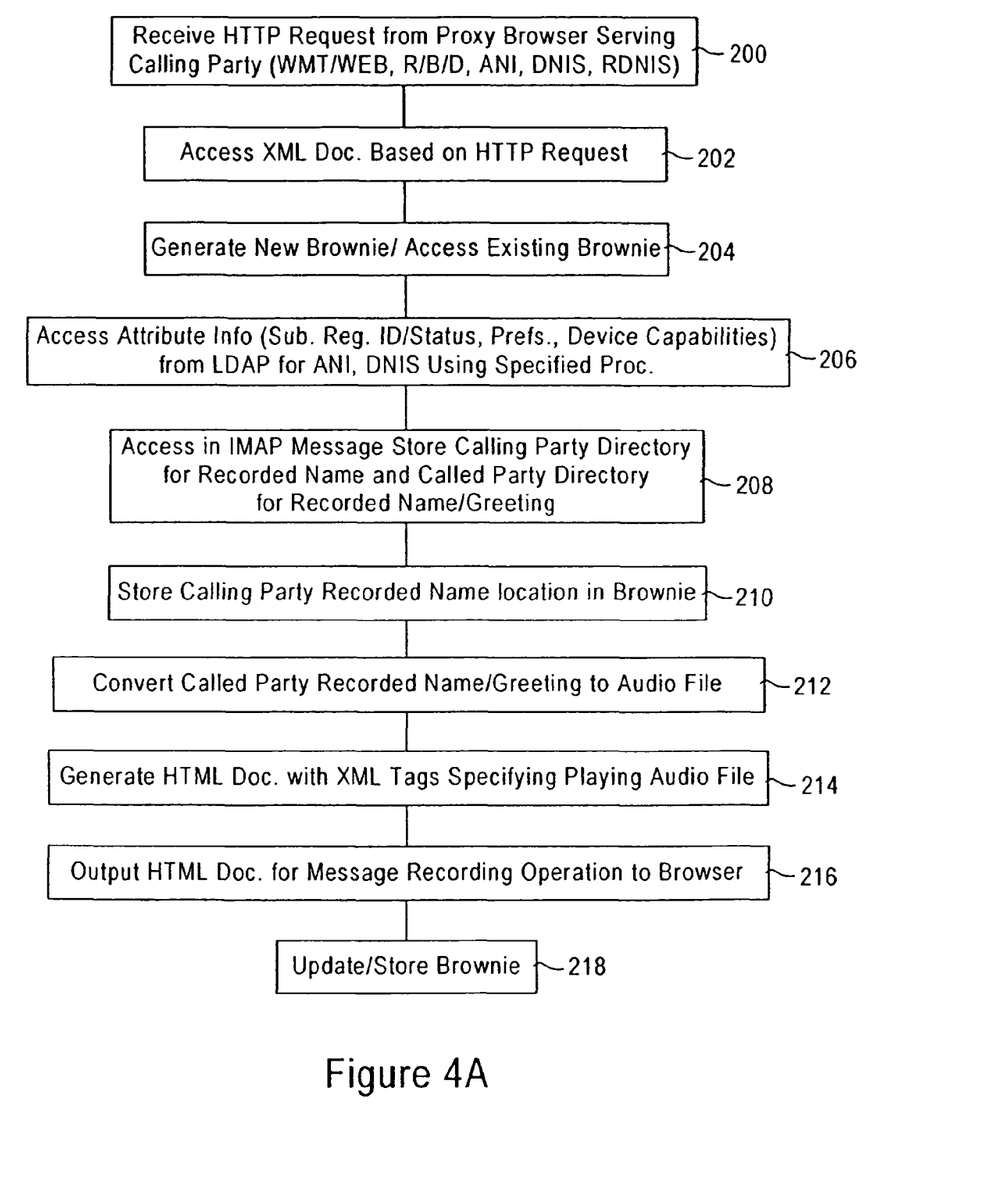
FIGS. 4A to 4C are diagrams illustrating the execution of unified messaging system operations according to an embodiment of the present invention.
Figure 4B:
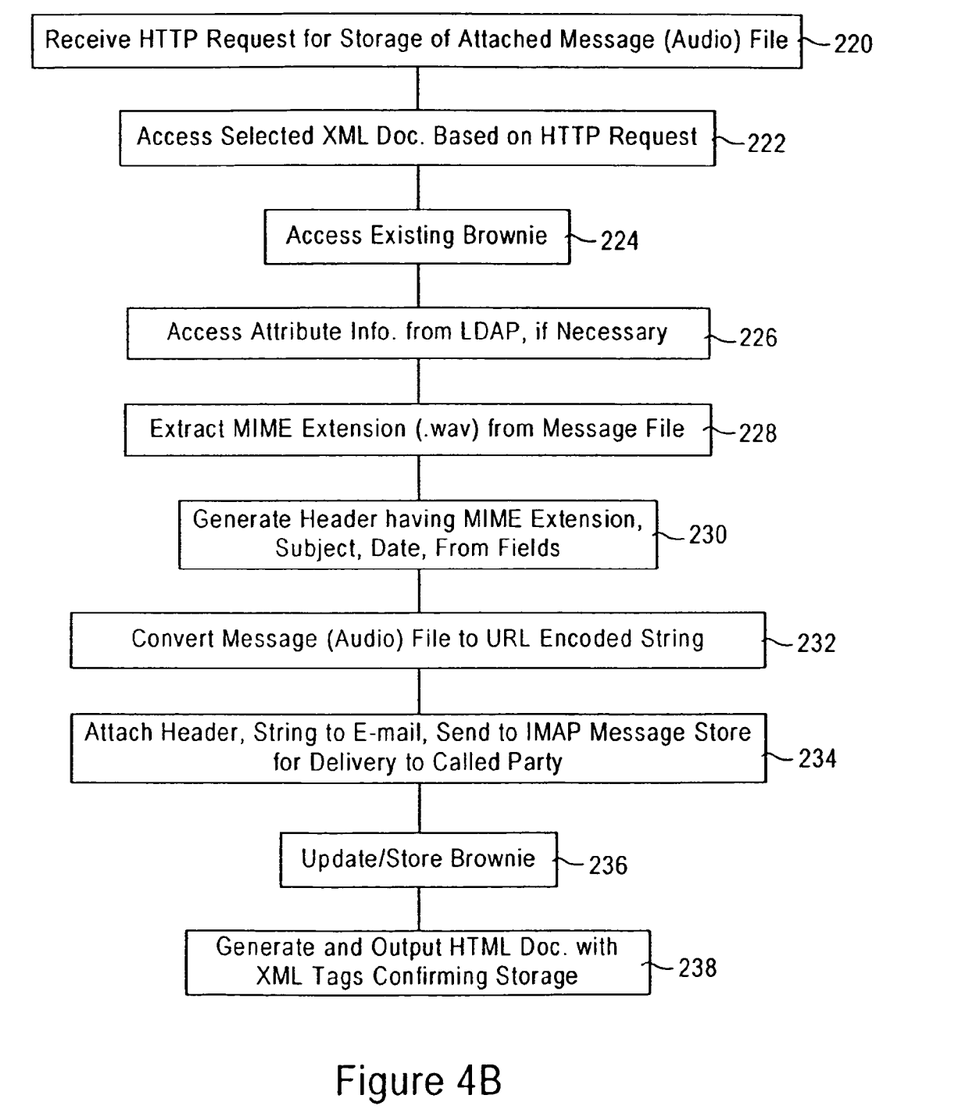
Figure 4C:
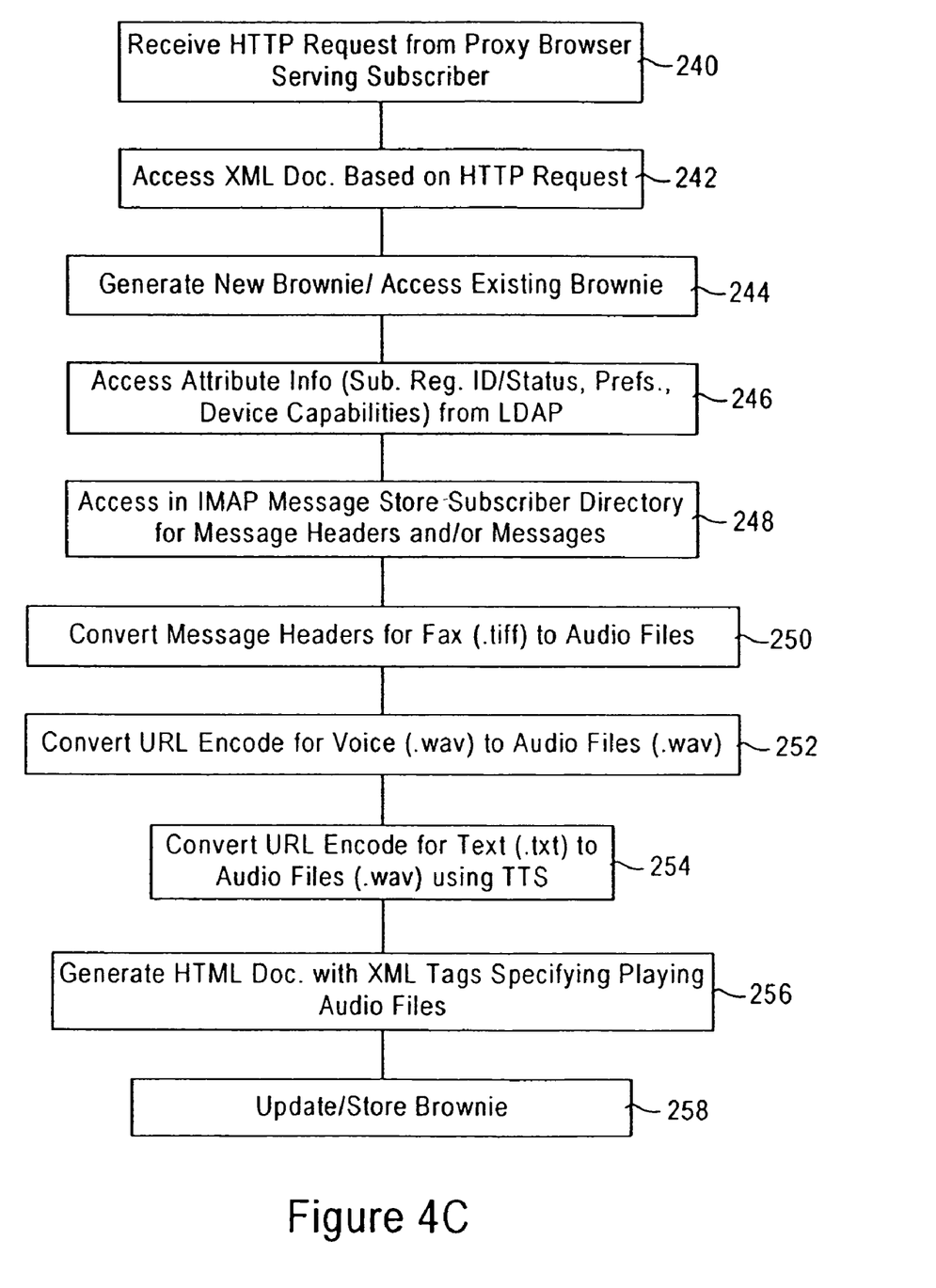

FIGS. 4A, 4B and 4C are diagrams illustrating messaging operations executed by the application server 66 according to an embodiment of the present invention. In particular, the application server 66 is configured for distributing messaging operations across multiple platforms by obtaining subscriber profile information from the LDAP message store 84, and storing and retrieving messages on the IMAP message store 86 in the form of e-mail messages having file attachments.

In particular, unified messaging involves the use of a directory structure and a message store capable of storing more than one type of message. The storage of e-mail messages within an IMAP message store 86 provides the advantage that messages can be stored according to subscriber directories, were each subscriber may have multiple subdirectories for storage of different messages, greetings, etc. In addition, the storage of the mail messages within the IMAP message store 86 by the application server 66 enables the application server 66 to store messages as attachments to the e-mail messages, so long as the attachments are compliant with the e-mail messaging protocols, such as simple mail transport protocol (SMTP) and RFC 822.

The voice application server 66 is configured for converting a received message, such as a voice message supplied by the proxy browser 62 as a MIME-encoded or DPIM-compliant audio file, into a standard protocol message supported by standardized protocols, such as simple mail transport protocol (SMTP). In particular, the application server 66 may implement the conversion of messages for example by generating a procedure call 104 to a prescribed API within the library 82. The application server 66 converts the .wav file, which is a binary file, by using a binary encode process to encode the .wav file into an ASCII string not to exceed 80 columns in width. The string is divided into 80 characters in length, and formatted to resemble a URL encoded string. The application server 66 also generates a header that includes messaging information, for example a "To" field, a "From" field, a "Subject" field, date and timestamp field, and a message format field that specifies the MIME encoding of the original message, for example ".wav" for audio files, ".txt" for e-mail messages, or ".tiff" for image documents such as facsimile transmissions.

Message format conversion may also be necessary, depending on the capabilities of the device couple to the proxy browser 62. For example, a user having a conventional telephone capable only of audio input and output may need the text to speech resource 88 in order to listen to e-mail messages, or to listen to header information for a received fax. However if a user has an attached fax machine but the telephony interface device (e.g., a voice over IP gateway or PBX) coupled to the proxy browser 62 lacks facsimile transmission capabilities, the application server 66 may access the outgoing fax server 90 for actual transmission of an image stored in the IMAP message store 86.

FIGS. 4A, 4B and 4C illustrating different unified messaging operations by the application server 66 according to an embodiment of the present invention. The steps described in FIGS. 4A, 4B and 4C can be implemented as executable code stored on a computer readable medium (e.g., a hard disk drive, a floppy drive, a random access memory, a read only memory, an EPROM, a compact disc, etc.).

FIG. 4A illustrates operations executed by the application server 66 in initiating a messaging operation for a calling party. As shown in FIG. 4A, the application server 66 receives in step 200 an HTTP request from the proxy browser 62 for initiation of a session enabling a calling party to leave a message. As shown in step 200, the application server 66 receives from the proxy browser 62 certain parameters, for example a command specifying the specific voice application operation to be performed, the type of service to be requested, and call parameters. For example, the parameter "WMT" specifies for the application server 66 that the proxy browser 62 operates according to a limited (i.e., lightweight) protocol, as opposed to a "WEB" parameter which specifies a PC Web browser 42 configured for processing all media types. The HTTP request also specifies whether the incoming call was redirected (R), whether a busy/no answer condition was detected (B), or whether the messaging system was direct dialed (D). The HTTP request also specifies the calling number (ANI), the destination number (DNIS), and/or the redirected number (RDNIS), for example the number of the messaging system. As apparent from the foregoing, the parameters are obtained by the proxy browser during interaction with a corresponding telephony device, such as a TNT server. In addition, the parameters may be passed as part of the URL specified in the HTTP post by the proxy browser 62.

The application server 66 responds to the HTTP request in step 202 by accessing a selected XML document 68 from the document database 72 based on the command specified in the HTTP request. The application server 66 then generates a new brownie in step 204, else accesses an existing brownie from the registry 92 based on a valid session identifier specified within the HTTP URL request.

The application server 66 then parses the selected XML document 68, which specifies a function call to the LDAP directory 84 and the IMAP message store 86. In particular, the application server 66 accesses in step 206 the LDAP directory 84 for user attribute information based on the calling party number (ANI) and the called number (DNIS). The user attribute information retrieved from the LDAP directory 84 may include subscriber registration identification (e.g., user name), subscriber status, preferences, and device capabilities (e.g., whether the user device has audio, text, and/or image capabilities).

The application server 66 also accesses the IMAP message store 86 in step 208 for retrieval of subscriber messaging information from the called party directory and/or the calling party directory, based on the user names obtained from the LDAP directory 84. For example, the application server 66 may access the calling party directory for the corresponding recorded name (i.e., spoken name), and the called party directory for the corresponding recorded name or the personalized greeting previously recorded by the called party. As described above, the recorded names and the personalized greetings are stored in the IMAP message store 86 as URL encoded attachments to e-mails stored in the user IMAP directories. As shown in FIG. 4A, the application server 66 stores into the brownie the calling party recorded name location in the IMAP directory in step 210, enabling the application server 66 to later generate the header for a message to be stored on behalf of the calling party for the called party.

The application server 66 then converts the called party recorded name or greeting from the URL encoded string into an audio .wav file in step 212. In particular, the application server 66 retrieves the URL encoded string and the corresponding header from the e-mail message fetched from the called party IMAP directory; the application server 66 determines the audio format for the URL encoded string by obtaining the MIME encoding from the retrieved header, and converts the URL encoded string back into an audio file according to the MIME encoding. The application server 66 then generates in step 214 an HTML document with XML tags specifying playing of the audio file as part of a message recording prompt in step 214, and forwards the HTML document in step 216 for execution by the proxy browser 62 to provide the calling party a prompt to leave a message, such as a voice message. The application server 66 then updates and stores the brownie for the messaging session with the calling party in step 218, and returns to a restful state. Additional details regarding execution of XML documents by the application server 66 are disclosed in the above-incorporated application Ser. No. 09/480,485.

Hence, the application server 66 accesses the LDAP directory 84 for user profile information, and accesses the IMAP message store 86 for retrieval of recorded messages from user directories, that are stored as URL encoded strings within e-mail attachments.

FIG. 4B is a diagram illustrating a second messaging operation following execution of the first HTML document, generated in FIG. 4A, by the proxy browser 62. In particular, FIG. 4B illustrates storage of a message such as a voice message left by a calling party via the proxy browser 62.

The application server 66 receives from the proxy browser 62 an HTTP request for storage of an attached audio file in step 220. The application server 66 accesses a selected XML document 68 from the document database 72 based on the HTTP request in step 222, and accesses in step 224 the existing brownie specified by the session identifier in the HTTP request from the brownie registry 92. The application server then accesses in step 226 any necessary attribute information from the LDAP directory 84.

The application server 66 then converts the audio file by extracting in step 228 the MIME extension from the message file, and generating in step 230 a header having the MIME extension, plus subject, the data, and "From" fields. As described above, the "From" field may include the recorded name of the calling party, recovered from the calling party's IMAP directory. The application server 66 then converts in step 232 the MIME encoded .wav file into a URL encoded string as described above.

The application server 66 then stores the message in step 234 by attaching the URL encoded string and the corresponding header to an e-mail, and sending the mail to the IMAP message store 86 for delivery to the called party. As described above, the application server 66 may use an API 82 to send the e-mail using an SMTP service 106. The application server 66 then updates and stores the brownie in step 236 and generates in step 238 an HTML document with XML tags for the proxy browser 62 to confirm with the calling party that the message has been sent.

As shown with respect to FIG. 4B the application server 66 is able to store any type of message within the IMAP message store 86 by converting the received a message into a generic format such as a URL encoded string, and attaching the encoded string and corresponding header to an e-mail message for storage in the IMAP message store 86. Hence, the application server 66 can provide unified messaging services using IP based message stores, enabling the unified messaging resources to be distributed across multiple servers.

FIG. 4C is a diagram illustrating the retrieval of messages by a subscriber. The application server 66 receives in step 240 an HTTP request from the proxy browser 62 serving the subscriber 240. In particular, the HTTP request may specify a direct dial into the telephone number for the messaging service, along with the telephone number (ANI) of the calling subscriber. In response the application server 66 accesses an XML document 68 from the database 72 in step 242, and generates a new brownie or accesses an existing brownie in step 244.

The application server 66 then accesses the subscriber attribute information in step 246 from the LDAP directory 84, for example subscriber identity, subscriber status, preferences, and device capabilities. The application server 66 also accesses the user's IMAP directory in step 248 based on the subscriber profile information obtained in step 246. In particular, the application server 66 selectively accesses either the entire message, or simply a message header, depending on the capabilities of the user's device. Hence, the application server 66 may merely access the header for a stored message identified as a fax if the user is using a telephone for retrieval of audible messages.

The application server 66 converts in step 250 message headers for messages incompatible with the user device (e.g., fax messages) into audio files to enable a user to identify header information such as origin, date, time, and subject. The application server 66 also converts URL encoded strings for voice messages into audio files in step 252. If desired, the application server 66 may also converts text based e-mail messages into audio files using the text to speech resource 88 in step 254. The application server 66 then generates an HTML document having XML times that specify playing of the audio files in step 256 and forwards the HTML document to the proxy browser 62 for execution. As apparent from the foregoing, the HTML document may include a single audio file to be played for a user, or multiple audio files that may be selected by the user. The application server 66 then updates and stores the brownie in step 258, and returns to a restful state.

According to the disclosed embodiment, voice mail and unified messaging services may be deployed on a platform that is customizable, scalable, and built upon open standards such as Internet protocol. Voice mail can now be extended to unified messaging, enabling users to access voice messages via PC-based browsers 42, or e-mail messages or information regarding received faxes via the telephone. Hence, unified voice messaging services can be implemented by information service providers without the necessity of telephony based voice mail systems that rely on proprietary telephony protocols.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an application server having a processor and a memory for executing a voice messaging application, the method comprising:

receiving a first HTTP request for execution of a prescribed voice messaging application operation for a subscriber;

accessing attribute information for the subscriber from an Internet Protocol (IP) based database server configured for storing subscriber attributes;

accessing an IP-based messaging server for subscriber messaging information based on the accessed attribute information, each stored message on the IP-based messaging server being stored within a corresponding e-mail message as a URL encoded string with the corresponding header information so that each stored message is encoded in the URL encoded string; and generating an HTML page, for execution of the prescribed voice messaging application operation and having media content and control tags, based on the first HTTP request and the subscriber messaging information.

2. The method of claim 1, wherein the receiving step includes recovering within the HTTP request a browser configuration, and call parameters.

3. The method of claim 2, wherein the recovering step includes identifying the browser configuration as one of a computer browser configuration configured for parsing a prescribed group of media tags and presenting a prescribed group of media types, and a lightweight browser configuration configured for parsing a prescribed portion of the prescribed group of media tags.

4. The method of claim 3, wherein the generating step includes generating the HTML page by selectively supplying media tag types based on the identified browser configuration.

5. The method of claim 2, wherein the call parameters include a called party identifier, the accessing step including retrieving the attribute information, specifying at least one of subscriber registration status and subscriber messaging preferences, based on the called party identifier.

6. The method of claim 5, wherein the call parameters include a calling party identifier, the accessing step further including retrieving second subscriber attribute information based on the calling party identifier.

7. The method of claim 1, wherein the accessing step includes accessing the IP-based database server according to LDAP protocol.

8. The method of claim 1, wherein the step of accessing the IP-based messaging server includes selectively obtaining from the IP-based messaging server at least one of a subscriber name, and a subscriber greeting as a subscriber prompt based on a subscriber identifier obtained from the accessed attribute information.

9. The method of claim 8, wherein the converting step includes converting the subscriber prompt from the corresponding URL encoded string into a media file having at least one prescribed media type.

10. The method of claim 9, wherein the converting step includes converting the subscriber prompt into a Multipurpose Internet Media Extension (MIME) type .wav file playable by a browser.

11. The method of claim 10, wherein the step of generating an HTML page includes inserting a first media tag including the .wav file and a second media tag configured for controlling playing of the .wav file.

12. The method of claim 1, wherein the step of accessing the IP-based messaging server includes determining a presence of a stored message on the IP-based messaging server for the subscriber based on the subscriber messaging information, the generating step including selectively inserting one of a first prompt file specifying no new messages and a second prompt file specifying the determined presence of the stored message, based on the subscriber messaging information.

13. The method of claim 12, wherein the step of accessing the IP-based messaging server further includes identifying, for each stored message, a corresponding message type based on the corresponding header information specifying the a Multipurpose Internet Media Extension (MIME) type, the second prompt file configured for specifying the corresponding message type for each stored message.

14. The method of claim 13, further comprising:
selecting one of the stored messages from the IP-based messaging server;
the converting step including converting the URL encoded string of the selected one message into a media file having a prescribed media type, based on the corresponding MIME type and determined capabilities of a browser having sent the first HTTP request, the generating step including inserting the media file into a media tag with a corresponding media control tag for playback of the media file by the browser.

15. The method of claim 14, wherein the converting step includes converting the URL encoded string to text and executing a text to speech routine for converting the text into an audio file based on the header information specifying text and the determined attributes specifying audio only.

16. The method of claim 13, wherein
the converting step includes converting selected header information into an audio file based on determining the MIME type is incompatible with determined capabilities of the browser, the generating step including inserting the audio file into the HTML page for playback by the browser.

17. The method of claim 1, further comprising:
receiving a second HTTP request for storage for the subscriber of a message having a prescribed messaging format; and
outputting to the IP-based messaging server an instruction for storage of a standard-format message, containing the message and header information specifying the prescribed messaging format, in a directory specified for the subscriber.

18. The method of claim 17, wherein the outputting step includes:
converting the message into the corresponding URL encoded string;
generating the corresponding header that specifies a Multipurpose Internet Media Extension (MIME) type for the prescribed messaging format; and
sending as the standard-format message an e-mail message, including the URL encoded string and the header as an attachment, to the IP-based messaging server according to SMTP protocol for delivery to the directory specified for the subscriber.

19. An application server configured for executing a voice messaging application, the application server including:
a hypertext transport protocol (HTTP) interface for receiving an HTTP request specifying execution of a prescribed voice messaging application operation for a subscriber; and
an application runtime environment configured for dynamically generating a processor configured for generating, in response to the HTTP request, a first hypertext markup language (HTML) document having media content for execution of the voice messaging application operation for the subscriber based on accessing attribute information for the subscriber from an Internet Protocol (IP) based database server configured for storing subscriber attributes, and based on accessing an IP-based messaging server for subscriber messaging information based on the accessed attribute information,
wherein each stored message on the IP-based messaging server is stored within a corresponding e-mail message as a URL encoded string with the corresponding header information so that each stored message is encoded in the URL encoded string.

20. The server of claim 19, wherein the application runtime environment is configured for determining subscriber registration status and subscriber messaging preferences in response to a called party identifier specified in the HTTP request.

21. The server of claim 20, wherein the application runtime environment accesses the IP-based database server and the IP-based messaging server according to LDAP protocol and IMAP protocol, respectively.

22. The server of claim 21, wherein the application runtime environment is configured for accessing from the IP-based messaging server at least one of a subscriber name and a subscriber greeting as a subscriber prompt based on the HTTP request specifying a condition for a calling party to leave a message for the subscriber, the application runtime environment converting the subscriber prompt into a media file playable by the browser and inserting the media file into the HTML document.

23. The server of claim 22, wherein the application runtime environment is configured for converting the subscriber prompt stored on the IP-based messaging server from a URL encoded string into an audio file as said media file.

24. The server of claim 21, wherein the application runtime environment is configured for accessing from the IP-based messaging server a message for a subscriber, stored on the IP-based messaging server as an e-mail message having the URL encoded string and corresponding header information that specifies a Multipurpose Internet Media Extension (MIME) type, the application runtime environment converting at least one of the header information and the URL encoded string into a media file having a selected media type based on the MIME type and determined capabilities of an input device used by the subscriber.

25. The server of claim 24, wherein the application runtime environment is configured for converting the header information into an audio file based on determining that the MIME type specifies an image and that the determined capabilities to not support the image.

26. The server of claim 24, wherein the application runtime environment is configured for converting the URL encoded string into text and converting the text into an audio file using a text to speech routine, based on the MIME type specifying text and the determined capabilities do not support text.

27. The server of claim 21, wherein the application runtime environment is configured for converting a message supplied by the HTTP request and having a prescribed messaging format into the URL encoded string, generating a header specifying a Multipurpose Internet Media Extension (MIME) type for the prescribed messaging format, and outputting to the IP-based messaging server an e-mail message, including the URL encoded string and the header as an attachment, for delivery to a directory specified for the subscriber.

28. The server of claim 19, wherein:
the HTTP interface is configured for receiving a second HTTP request for storage for the subscriber of a message having a prescribed messaging format;
the application runtime environment configured for outputting to the IP-based messaging server an instruction for storage of a standard-format message, containing the message and header information specifying the prescribed messaging format, in a directory specified for the subscriber, based on:
(1) converting the message into the corresponding URL encoded string;

(2) generating the corresponding header that specifies the corresponding Multipurpose Internet Media Extension (MIME) type for the prescribed messaging format, and (3) sending as the standard-format message an e-mail message, including the URL encoded string and the header as an attachment, to the IP-based messaging server according to SMTP protocol for delivery to the directory specified for the subscriber.

29. A non-transitory computer readable medium having stored thereon sequences of instructions for executing a voice messaging application, the sequences of instructions including instructions for performing the steps of:

receiving a first HTTP request for execution of a prescribed voice messaging application operation for a subscriber;

accessing attribute information for the subscriber from an Internet Protocol (IP) based database server configured for storing subscriber attributes;

accessing an IP-based messaging server for subscriber messaging information based on the accessed attribute information, each stored message on the IP-based messaging server being stored within a corresponding e-mail message as a URL encoded string with the corresponding header information so that each stored message is encoded in the URL encoded string; and generating an HTML page, for execution of the prescribed voice messaging application operation and having media content and control tags, based on the first HTTP request and the subscriber messaging information.

30. The medium of claim 29, wherein the receiving step includes recovering within the HTTP request a browser configuration, and call parameters.

31. The medium of claim 30, wherein the recovering step includes identifying the browser configuration as one of a computer browser configuration configured for parsing a prescribed group of media tags and presenting a prescribed group of media types, and a lightweight browser configuration configured for parsing a prescribed portion of the prescribed group of media tags.

32. The medium of claim 31, wherein the generating step includes generating the HTML page by selectively supplying media tag types based on the identified browser configuration.

33. The medium of claim 30, wherein the call parameters include a called party identifier, the accessing step including retrieving the attribute information, specifying at least one of subscriber registration status and subscriber messaging preferences, based on the called party identifier.

34. The medium of claim 33, wherein the call parameters include a calling party identifier, the accessing step further including retrieving second subscriber attribute information based on the calling party identifier.

35. The medium of claim 29, wherein the accessing step includes accessing the IP-based database server according to LDAP protocol.

36. The medium of claim 29, wherein the step of accessing the IP-based messaging server includes selectively obtaining from the IP-based messaging server at least one of a subscriber name, and a subscriber greeting as a subscriber prompt based on a subscriber identifier obtained from the accessed attribute information.

37. The medium of claim 36, further comprising instructions for performing the step of converting the subscriber prompt into a media file having at least one prescribed media type.

38. The medium of claim 37, wherein the converting step includes converting the subscriber prompt into a Multipurpose Internet Media Extension (MIME) type .wav file playable by a browser.

39. The medium of claim 38, wherein the step of generating an HTML page includes inserting a first media tag including the .wav file and a second media tag configured for controlling playing of the .wav file.

40. The medium of claim 29, wherein the step of accessing the IP-based messaging server includes determining a presence of a stored message on the IP-based messaging server for the subscriber based on the subscriber messaging information, the generating step including selectively inserting one of a first prompt file specifying no new messages and a second prompt file specifying the determined presence of the stored message, based on the subscriber messaging information.

41. The medium of claim 40, wherein the step of accessing the IP-based messaging server further includes identifying, for each stored message, a corresponding message type based on the corresponding header information specifying a Multipurpose Internet Media Extension (MIME) type, the second prompt file configured for specifying the corresponding message type for each stored message.

42. The medium of claim 41, wherein the medium further comprises instructions for performing the steps of:

selecting one of the stored messages from the IP-based messaging server;

converting the URL encoded string of the selected one message into a media file having a prescribed media type, based on the corresponding MIME type and determined capabilities of the browser having sent the first HTTP request, the generating step including inserting the media file into a media tag with a corresponding media control tag for playback of the media file by the browser.

43. The medium of claim 42, wherein the converting step includes converting the URL encoded string to text and executing a text to speech routine for converting the text into an audio file based on the header information specifying text and the determined attributes specifying audio only.

44. The medium of claim 41, wherein the converting step includes converting selected header information into an audio file based on determining the MIME type is incompatible with determined capabilities of the browser, the generating step including inserting the audio file into the HTML page for playback by the browser.

45. The medium of claim 29, further comprising instructions for performing the steps of:

receiving a second HTTP request for storage for the subscriber of a message having a prescribed messaging format; and outputting to the IP-based messaging server an instruction for storage of a standard-format message, containing the message and header information specifying the prescribed messaging format, in a directory specified for the subscriber.

46. The medium of claim 45, wherein the outputting step includes:

converting the message into a URL encoded string;

generating a header that specifies a Multipurpose Internet Media Extension (MIME) type for the prescribed messaging format; and sending as the standard-format message an e-mail message, including the URL encoded string and the header as an attachment, to the IP-based messaging server according to SMTP protocol for delivery to the directory specified for the subscriber.

47. An application server configured for executing a voice messaging application, the application server including:
 a hypertext transport protocol (HTTP) interface for receiving an HTTP request specifying execution of a prescribed voice messaging application operation for a subscriber; and
 means for dynamically generating, in response to the HTTP request, a first hypertext markup language (HTML) document having media content for execution of the voice messaging application operation for the subscriber based on accessing attribute information for the subscriber from an Internet Protocol (IP) based database server configured for storing subscriber attributes, and based on accessing an IP-based messaging server for subscriber messaging information based on the accessed attribute information,
 wherein each stored message on the IP-based messaging server is stored within a corresponding e-mail message as a URL encoded string with the corresponding header information so that each stored message is encoded in the URL encoded string.

48. The server of claim 47, wherein the generating means is configured for determining subscriber registration status and subscriber messaging preferences in response to a called party identifier specified in the HTTP request.

49. The server of claim 48, wherein the generating means includes means for accessing the IP-based database server and the IP-based messaging server according to LDAP protocol and IMAP protocol, respectively.

50. The server of claim 49, wherein the generating means is configured for accessing from the IP-based messaging server at least one of a subscriber name and a subscriber greeting as a subscriber prompt based on the HTTP request specifying a condition for a calling party to leave a message for the subscriber, the generating means converting the subscriber prompt into a media file playable by a browser and inserting the media file into the HTML document.

51. The server of claim 50, wherein the generating means is configured for converting the subscriber prompt stored on the IP-based messaging server from the URL encoded string into an audio file as said media file.

52. The server of claim 49, wherein the generating means is configured for accessing from the IP-based messaging server a message for a subscriber, stored on the IP-based messaging server as an e-mail message having the URL encoded string and corresponding header information that specifies a Multipurpose Internet Media Extension (MIME) type, the generating means converting at least one of the header information and the URL encoded string into a media file having a selected media type based on the MIME type and determined capabilities of an input device used by the subscriber.

53. The server of claim 52, wherein the generating means is configured for converting the URL encoded string into an audio file based on the MIME type specifying a .wav type.

54. The server of claim 52, wherein the generating means is configured for converting the URL encoded string into text and converting the text into an audio file using a text to speech routine, based on the MIME type specifying text and the determined capabilities to not support text.

55. The server of claim 49, wherein the generating means is configured for converting a message supplied by the HTTP request and having a prescribed messaging format into a URL encoded string, generating a header specifying a Multipurpose Internet Media Extension (MIME) type for the prescribed messaging format, and outputting to the IP-based messaging server an e-mail message, including the URL encoded string and the header as an attachment, for delivery to a directory specified for the subscriber.

56. The server of claim 47, wherein:
 the HTTP interface is configured for receiving a second HTTP request for storage for the subscriber of a message having a prescribed messaging format;
 the generating means configured for outputting to the IP-based messaging server an instruction for storage of a standard-format message, containing the message and header information specifying the prescribed messaging format, in a directory specified for the subscriber, based on:
  (1) converting the message into the corresponding URL encoded string;
  (2) generating the corresponding header that specifies the corresponding Multipurpose Internet Media Extension (MIME) type for the prescribed messaging format, and
  (3) sending as the standard-format message an e-mail message, including the URL encoded string and the header as an attachment, to the IP-based messaging server according to SMTP protocol for delivery to the directory specified for the subscriber.

57. A method in an application server for executing a voice messaging application, the method comprising:
 receiving, from a browser, a first HTTP request for execution of a prescribed voice messaging application operation for a subscriber;
 accessing attribute information for the subscriber from an Internet Protocol (IP) based database server configured for storing subscriber attributes;
 accessing an IP-based messaging server for subscriber messaging information based on the accessed attribute information, each stored message on the IP-based messaging server being stored within a corresponding e-mail message as a URL encoded string with the corresponding header information so that the each stored message is encoded in the URL encoded string; and
 generating an HTML page, for execution of the prescribed voice messaging application operation and having media content and control tags, based on the first HTTP request and the subscriber messaging information.

58. The method of claim 57, wherein the receiving step includes recovering within the HTTP request a browser configuration, and call parameters.

59. The method of claim 58, wherein the recovering step includes identifying the browser configuration as one of a computer browser configuration configured for parsing a prescribed group of media tags and presenting a prescribed group of media types, and a lightweight browser configuration configured for parsing a prescribed portion of the prescribed group of media tags.

* * * * *